Patented June 25, 1929.

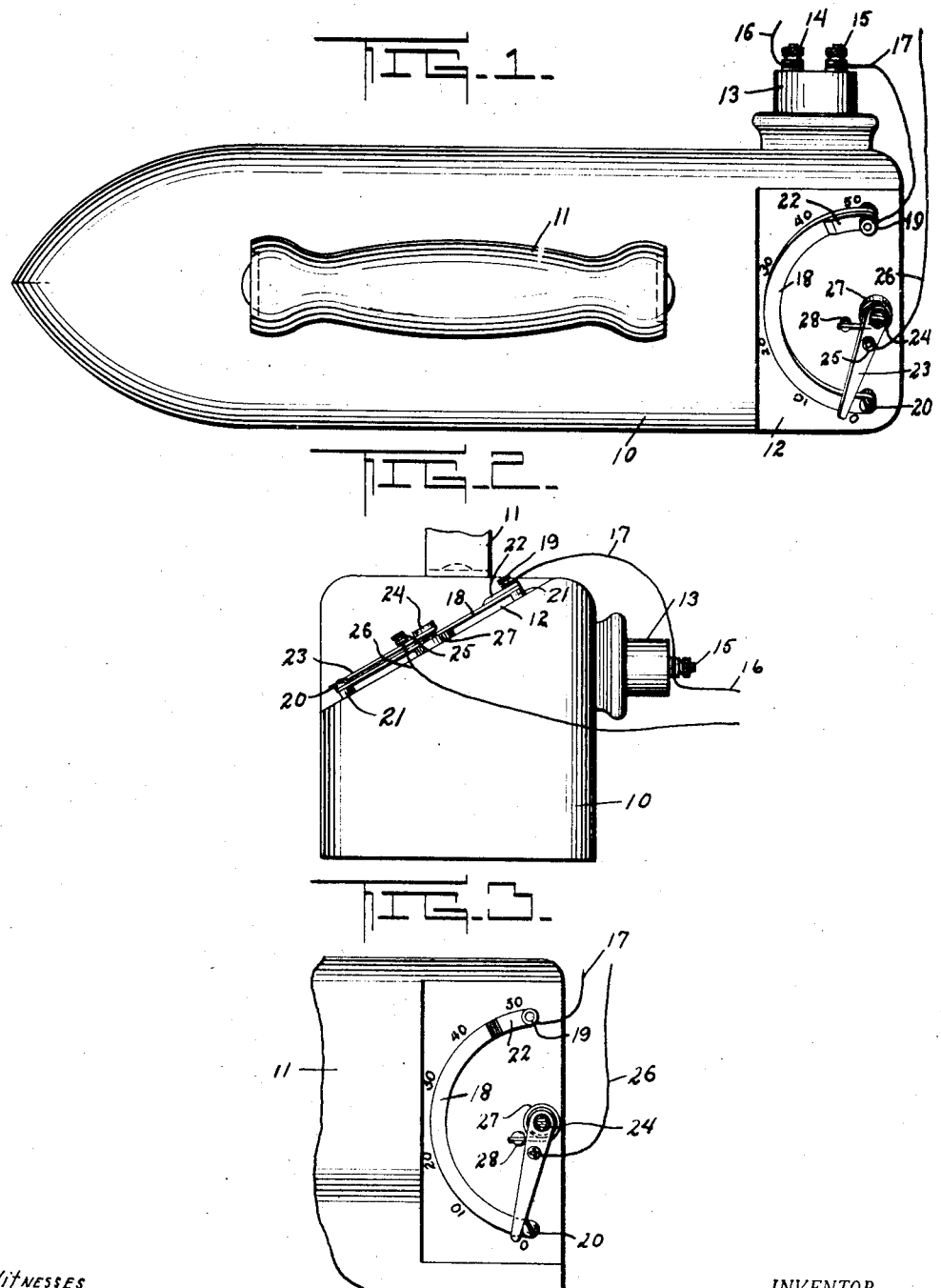

1,718,403

UNITED STATES PATENT OFFICE.

JOSEPH BOLF, OF ROSLYN, WASHINGTON.

HEAT INDICATOR FOR ELECTRIC IRONS.

Application filed August 11, 1927. Serial No. 212,323.

This invention relates to an improved heat indicator for an electric iron and the principal object of the invention is to provide an indicator whch may be associated with an electrically heated iron having a conventional form of heating means, the indicator being so constructed that it will advance across a scale as the heat increases thus indicating the heat of the iron.

Another object of the invention is to provide improved means for movably mounting the indicating pointer and to further so mount this pointer that it will be moved across the arc carrying the scale through the expansion and contraction of a spring connected with the pivoted end of the pointer.

This invention is illustrated in the accompanying drawings wherein:—

Figure 1 is a view showing an iron in top plan provided with the improved indicating means, Figure 2 is a view of the iron in Figure 1 shown in rear elevation, and Figure 3 is a fragmentary view of the rear end portion of the iron showing the indicating means connected therewith.

The iron 10 is provided with a handle 11 and has its rear end portion cut away to provide a seat 12 to receive the indicating means. If desired the cut away portion of this iron forming the seat can be walled in and provided with a transparent cover so that heat will be confined in this chamber and the indicating means prevented from returning to the position shown in Figures 1 and 3 too rapidly. A conventional form of electrically operated heating means will be provided and includes a terminal 13 carrying posts 14 and 15 with which are connected wires 16 and 17. The scale rack or bar 18 of the indicating mechanism is placed upon the seat 12 and is held in place by the fasteners 19 and 20, the fastener 19 constituting a post for engagement by the wire 17. This bar 18 is formed of material capable of carrying electricity and will be insulated from the body of the iron as shown at 21 in Figure 2 and will further carry at one end an insulating strip 22 to break the connection between the bar 18 and the pointer 23.

A pointer 23 is fixedly mounted upon the axle 24, this axle being turnably mounted upon the iron 10. The pointer carries a post 25 with which is connected wire 26. The wires 16 and 26 are power wires and will be connected with a source of power in any suitable manner. In order to move the pointer 23 there is provided a spring 27 connected with the body of the iron as shown at 28 and having its inner ends connected with the axle so that when the spring expands and contracts the axle will be rotated and the pointer swung in the arc of a circle from the position shown in Figures 1 and 3 to the opposite end of the scale bar. As the heat increases upon the current being turned on, the pointer will gradually swing along the scale bar and will eventually reach the insulating block 22 thus breaking the circuit and preventing the current from passing from the pointer 23 to the wire 17. When this connection is broken the heating of the iron will be interrupted and the spring 27 will gradually cool and contract thus drawing the pointer back upon the scale bar thus again establishing the circuit and permitting the iron to be again heated and of course kept at substantially a set rate of heat.

By referring particularly to Fig. 3, it will be noted that although the spring 27 is coiled about the axle 24 it is at all times under the pointer 23. By considering Fig. 2 it will be seen that the height of spring 27 is less than the distance the bar 18 is supported from the face of the seat 12. Therefore as the outer end of the pointer overhangs the bar 18 there is no chance of the spring interfering with the movement of the bar. However, even though this thermostatic control device is positioned on the seat of the iron, where it is plainly visible at all times, the pointer 23 will shield the spring 27 from injury and tend to keep the spring in position and condition for proper operation at all times.

When the iron is no longer in use, it will be disconnected from the source of power and the iron will then cool and the spring contract thus returning the pointer to the position shown in the drawing. It will thus be seen that a very efficient device has been provided for indicating the heat of an iron and further for retaining the iron at approximately a set degree of heat.

What is claimed is:—

A device of the character described comprising a support, an axle extending from and being turnably mounted upon said support, a pointer fixedly mounted upon said axle at a distance from the face of said support, a graduated bar fixedly supported at a distance from the face of said support, the outer end of said pointer overhanging said bar, whereby said pointer is held at a distance from the face of said support, and upon movement traverses said graduations, and a temperature responsive spring, to actuate said pointer, coiled about said axle under said pointer and having its ends connected to said support and said axle, whereby said spring will be protected by said pointer although the pointer will be held from accidental engagement with said spring, as and for the purposes set forth.

In testimony whereof I affix my signature.

JOSEPH BOLF.